United States Patent [19]

Yoshida

[11] Patent Number: 5,359,228
[45] Date of Patent: Oct. 25, 1994

[54] OPERATING METHOD FOR A HYBRID CAR

[75] Inventor: Masato Yoshida, Kyoto, Japan

[73] Assignee: Mitsubishi Jidosha Kogyo Kabushiki Kaisha, Tokyo, Japan

[21] Appl. No.: 60,989

[22] Filed: May 14, 1993

[30] Foreign Application Priority Data

May 15, 1992 [JP] Japan ................................ 4-123818

[51] Int. Cl.⁵ ..................... B60L 11/02; B60L 11/12; F02D 29/06
[52] U.S. Cl. ........................................ 290/17; 290/16; 290/45; 290/50
[58] Field of Search ................... 290/16, 17, 45, 50

[56] References Cited

U.S. PATENT DOCUMENTS

| | | | |
|---|---|---|---|
| 3,792,327 | 2/1974 | Waldorf | 290/16 |
| 4,306,156 | 12/1981 | Monoco et al. | 290/17 |
| 5,081,365 | 1/1992 | Field et al. | 290/45 |

FOREIGN PATENT DOCUMENTS

4109379 10/1991 Fed. Rep. of Germany .

*Primary Examiner*—A. D. Pellinen
*Assistant Examiner*—Robert Lloyd Hoover

[57] ABSTRACT

An operating method for a hybrid car which has an electric motor for driving the vehicle and an internal combustion engine for power generation. Using an operational expression including a motor output correction factor whose value is variably adjusted to different values depending on whether the engine is operated for battery charging or the engine is stopped, a required motor current supply that matches the vehicle operating state represented by an actual vehicle speed and an accelerator pedal depression depth is calculated, and the motor current supply is controlled in accordance with the result of the calculation. Consequently, the cruising range of the hybrid car is increased, and also the power performances and exhaust gas characteristics of the hybrid car are improved.

8 Claims, 5 Drawing Sheets

OPERATING METHOD FOR A HYBRID CAR

BACKGROUND OF THE INVENTION

The present invention relates to a hybrid car provided with an electric motor used to drive the vehicle and an internal combustion engine for power generation, and more particularly, to an operating method for a hybrid car, which permits an increased cruising range and improved power performances of the vehicle, without abandoning an advantage of an electric car that the exhaust gas characteristics are excellent.

Recently, the regulations on exhaust gas from those vehicles which use an internal combustion engine as their drive source have been made more rigorous to tackle environmental pollution. In this respect, various new technologies have been developed. Electric cars, which use an electric motor as their drive source and produce no exhaust gas, should be ideal motor vehicles for reduction of the exhaust gas amount. Typical electric cars are designed so that a battery is used to supply the electric motor with electric power. Naturally, however, the available battery capacity for each vehicle is limited, so that the power performances are poorer and the cruising range is shorter than those of the vehicles which use an internal combustion engine as the drive source. In order to make the electric cars more popular, these technical problems are expected to be solved.

Hybrid cars, which are equipped with an electric motor for vehicle drive and an internal combustion engine for power generation, are believed to be promising modern electric ears which can enjoy an increased cruising range. In hybrid cars, a driving current, with which a required motor output determined according to vehicle operating conditions can be produced, is supplied to the electric motor to obtain required power performance. When the storage amount of the battery is reduced, a generator is driven by the engine to charge the battery with the power generated by the generator; and when the battery charging is unnecessary, the engine is stopped.

However, in the case where the engine is operated or stopped depending upon the presence/absence off the need of battery charging, it is in actuality difficult to always produce a required motor output with accuracy even if the electric motor is supplied with a driving current such that the required motor output can be produced. In general, the voltage of power generated by the generator is higher than the output voltage of the battery, and the voltage applied to the motor is higher during operation of the engine than during stoppage of the same. Thus, even if the driving current supplied to the motor is maintained at a constant value, the actual motor output is greater during operation of the engine than during stoppage of the same. Accordingly, even when the vehicle operating condition remains unchanged and the motor output must be maintained at a constant level, the actual motor output varies and also the running characteristics of the vehicle vary, depending on whether the engine is operating or stopped. Likewise, also when the vehicle operating condition changes, the running characteristics are likely to vary, depending on whether the engine is operating or stopped. In such cases, the behavior of the running vehicle becomes contrary to the driver's intention, giving rise to a problem that the driver receives different feelings when operating the vehicle.

OBJECT AND SUMMARY OF THE INVENTION

An object of the present invention is to provide an operating method for a hybrid car provided with an electric motor used to drive the vehicle and an internal combustion engine for power generation, which method permits an increased cruising range and improved power performances of the vehicle, without abandoning an advantage of an electric car that the exhaust gas characteristics are excellent.

According to the present invention, there is provided an operating method for a hybrid car which has an electric motor for driving the vehicle, a battery for supplying electric power to the electric motor, a generator for charging the battery, and an internal combustion engine operatively isolated from the electric motor and used to drive the generator. The method comprises the steps of: discriminating the operating state of the vehicle by means of first discriminating means; discriminating the charged state of the battery by means of second discriminating means; controlling the operating state of the internal combustion engine by means of a controller in accordance with at least one of results of the discriminations relating to the vehicle operating state and the battery charged state; and controlling the electric power supplied to the electric motor. The electric power control step includes a step of supplying electric power solely from the battery to the electric motor in accordance with the operating state of the vehicle when the internal combustion engine is not operated to generate electric power by means of the generator, and a step of supplying electric power generated by the generator to the electric motor when the internal combustion engine is operated to generate electric power by means of the generator. In the electric power control step, the electric power from the generator is adjusted such that an equivalent generator electric power to the battery electric power, obtained through an equivalence conversion, or a sum of the equivalent generator electric power and the battery electric power matches the operating state of the vehicle.

Preferably, the equivalence conversion is carried out using a factor having a specific fixed value or a value which changes continuously or in a multistage fashion in accordance with the quantity of electric power generated by the generator.

A major advantage of the present invention resides in that, in the step of controlling the electric power supplied to the motor, the electric power is supplied solely from the battery to the motor when the engine is not operated for the power generation, whereas when the engine is operated for the power generation, electric power from the generator, which has been adjusted such that an equivalent electric power of the generator, obtained through an equivalence conversion, to the electric power of the battery or a sum of the equivalent generator electric power and the battery electric power matches the operating state of the vehicle, is supplied to the motor. More specifically, a command motor output is determined in accordance with a characteristic which represents a motor output required by operation of the accelerator pedal and which changes with operating states of the internal combustion engine (e.g., a characteristic which varies with change of the output voltage of the generator), and the power supply is controlled in accordance with the command motor output thus determined.

Consequently, when the power supply from the generator or battery to the electric motor is controlled in accordance with the command motor output, the command motor output can be variably adjusted in such a manner as to compensate for an error, for example, a change of the voltage applied to the motor, which error is caused due to change of the engine operating condition and brings about a change of the motor output. Accordingly, even in the case where the engine operating condition undergoes a variety of changes while the vehicle is running, a motor output matched with the vehicle operating conditions, which vary as the accelerator pedal is operated, can always be produced with accuracy, thus improving the power performances of the vehicle. Further, the battery can be charged as required, without lowering the power performances of the vehicle, whereby the cruising range is increased. Furthermore, the engine operation is stopped when the battery charging is not necessary, and thus the exhaust gas characteristics of the vehicle are improved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION FOR THE PREFERRED EMBODIMENT

Figure 1:
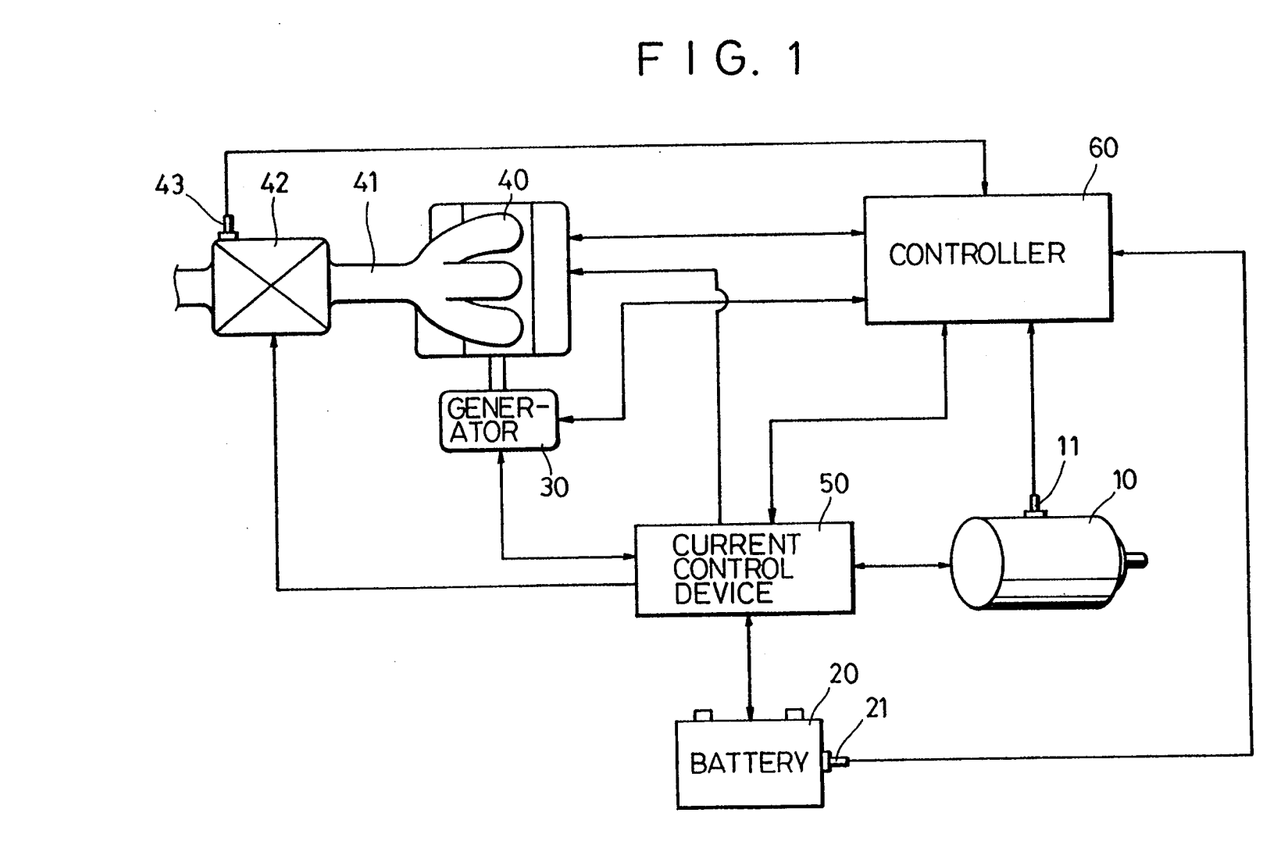
FIG. 1 is a schematic view showing the principal part of a hybrid car to which is applied an operating method for an internal combustion engine for power generation according to one embodiment of the present invention.

Referring to FIG. 1, a hybrid car (vehicle) is provided with a certain number of electric motors (one of which is denoted by numeral 10) depending on its specifications. The electric motor 10, which is used as a drive source for the vehicle, is formed of a DC or AC motor, and its output shaft is operatively connected to driving wheels (not shown) of the vehicle through a power transmission mechanism (not shown) of the vehicle. The electric motor 10 is connected electrically to a battery 20 through a current control device 50 which operates under the control of a controller 60. While the vehicle is running, the electric motor 10 normally drives the vehicle as the electric motor 10 receives power supply from the battery 20. When the vehicle is in a decelerating operation, the electric motor 10 functions as an electric generator to generate deceleration recovery power, with which the battery 20 is charged. Further, the electric motor 10 is fitted with a motor temperature sensor 11 for detecting the motor temperature. Also, the battery 20 is fitted with a battery capacity sensor 21 for detecting a parameter indicative of the battery capacity, e.g., battery voltage value.

The hybrid car is further provided with an electric generator 80 for generating electric power for battery charging, and an internal combustion engine 40 having an output shaft operatively connected to the generator shaft and serving to drive the electric generator 30. The electric generator 30, which is formed of a DC or AC generator, is connected electrically to the battery 20 through the current control device 50. Thus, the battery 20 is charged with electric power electric generated by the generator 30 during the operation the internal combustion engine 40. Further, the electric generator 30 is furnished with a control section (not shown), used to adjust the quantity of generated power and stop power generation, and various sensors (not shown) for detecting generator operation information, including the temperature, failed state, etc. of the electric generator 30. At the start of the engine operation, the electric generator 30 functions as a so-called starter which starts the internal combustion engine 40 when supplied with electric power from the battery 20. Alternatively, an engine starter may be provided separately from the electric generator 30. In this case, the electric generator 30 is used for power generation only.

The internal combustion engine 40 for power generation includes an engine body, formed of, e.g., a small lightweight piston engine, and an engine drive system (not shown). The engine drive system includes a fuel supply system having a throttle valve, an ignition system, a fuel injection system, and various actuators connected electrically to the current control device 50, and is used for start and stop of the engine, engine speed control, and throttle valve opening control. An exhaust gas purifier 42 is attached to an exhaust pipe 41 which is connected to an exhaust port (not shown) of the engine 40 and is used to discharge exhaust gas. The exhaust gas purifier 42 is composed of a catalyst for removing pollutant or noxious gases, such as CO, $NO_X$, etc., from the exhaust gas passing through the exhaust pipe 41, and an electrically-heated catalyst heater which is connected to the battery 20 through the current control device 50. When the catalyst is heated to be activated by means of the heater, it can produce a very strong exhaust gas purifying effect. The exhaust gas purifier 42 is fitted with a catalyst temperature sensor 43 for detecting the catalyst temperature. Further, the internal combustion engine 40 is provided with various sensors (not shown) for detecting engine operation information, including the engine speed, air intake, throttle valve opening, etc.

The current control device 50, which is located among the electric motor 10, battery 20, electric generator 30, internal combustion engine 40, and the catalyst heater of the exhaust gas purifier 42, as described above, serves to switch the electrical connections between the corresponding ones of the aforesaid elements under the control of the controller 60, and to adjust the current value and direction of the power supply between the corresponding elements. The current control device 50 includes, for example, an input section (not shown) for receiving current control device control signals from the controller 60, an adjustment section (not shown) which operates in response to a control output delivered from the input section for the electrical connection switching and for the adjustment of the value and direction of current supply, and a power converter section (not shown) which operates in response to a control output from the adjustment section. The current control device 50 is provided with various sensors (not shown) for detecting the temperature, failed state, etc. of the current control device 50.

The controller 60 receives various kinds of operation information from the various components of the hybrid ear and the sensors, and controls the operations of the electric motor 10, internal combustion engine 40, and current control device 50. The controller 60 includes, for example, a processor (not shown) for executing control programs, which will be mentioned later, memories (not shown) for storing the control programs, various data, etc., and interface circuits (not shown) for signal transfer between the controller 60 and the aforesaid various components and sensors.

Specifically, the controller 60 is connected electrically to the motor temperature sensor 11 attached to the electric motor 10, the battery capacity sensor 21 attached to the battery 20, the catalyst temperature sensor 43 attached to the exhaust gas purifier 42, and the various sensors attached individually to the electric generator 30, internal combustion engine 40, and current control device 50. Also, the controller 60 is connected electrically to various sensors (not shown) which are arranged in the hybrid car and used to detect vehicle operation information, such as the vehicle velocity, depth of accelerator pedal depression, etc. The controller 60 receives from these sensors a motor temperature signal, battery capacity signal, catalyst temperature signal, generator operation information (e.g., temperature and failed state of the electric generator 30), internal combustion engine operation information (e.g., rotation speed, air intake, and throttle valve opening of the internal combustion engine 40), current control device operation information (e.g., failed state of current control device 50), and vehicle operation information. Based on the various signals and information thus received, the controller 60 sets generator control signals associated with the control of the electric generator 30 for the quantity of generated power, suspension of the power generation, etc., internal combustion engine control signals associated with the control of the internal combustion engine 40 for its starting, stopping, speed, etc., and the current control device control signals associated with the control of the current value, current supply direction, etc. for the power supply between the aforesaid components which are connected to the current control device 50. The controller 60 delivers these set control signals to the electric generator 30, internal combustion engine 40, and current control device 50.

Referring now to FIGS. 2 to 6, operation control of the electric motor 10, internal combustion engine 40, and exhaust gas purifier 42 by means of the controller 60 will be described.

Figure 2:
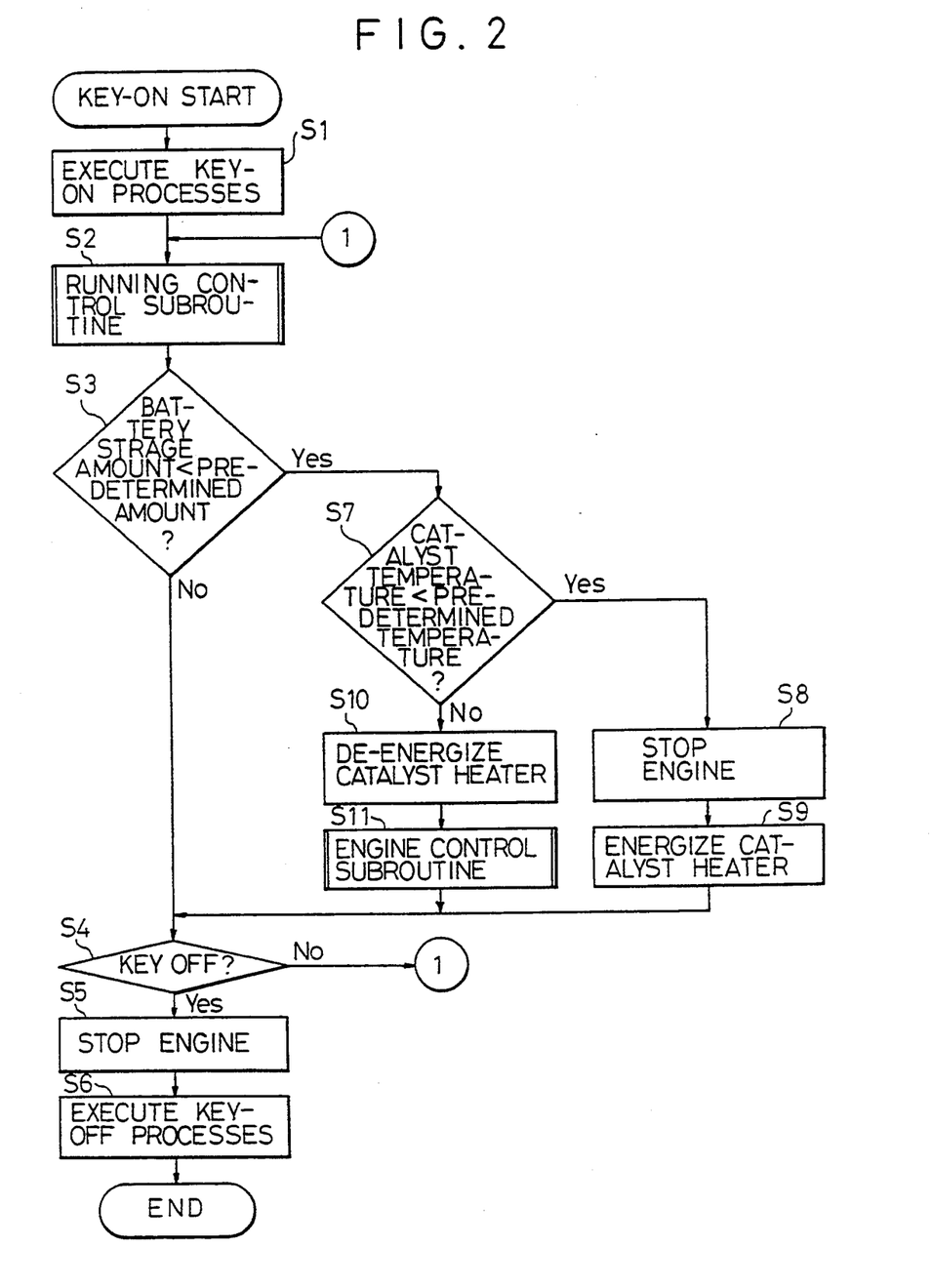
FIG. 2 is a flow chart illustrating a main routine for operation control of an electric motor for vehicle drive, an internal combustion engine for power generation, and a catalyst heater executed by means of a controller shown in FIG. 1.

When a driver turns on a starter key to actuate the vehicle, the processor of the controller 60 discriminates the key-on operation, and starts executing a main routine shown in FIG. 2. More specifically, the processor first executes key-on processes, including reading control data, backed up at the end of the preceding vehicle running cycle, from the memories, checking the operating conditions of the various components of the hybrid car, etc. (Step S1), and then executes a running control subroutine shown in detail in FIG. 3 (Step S2).

Figure 3:
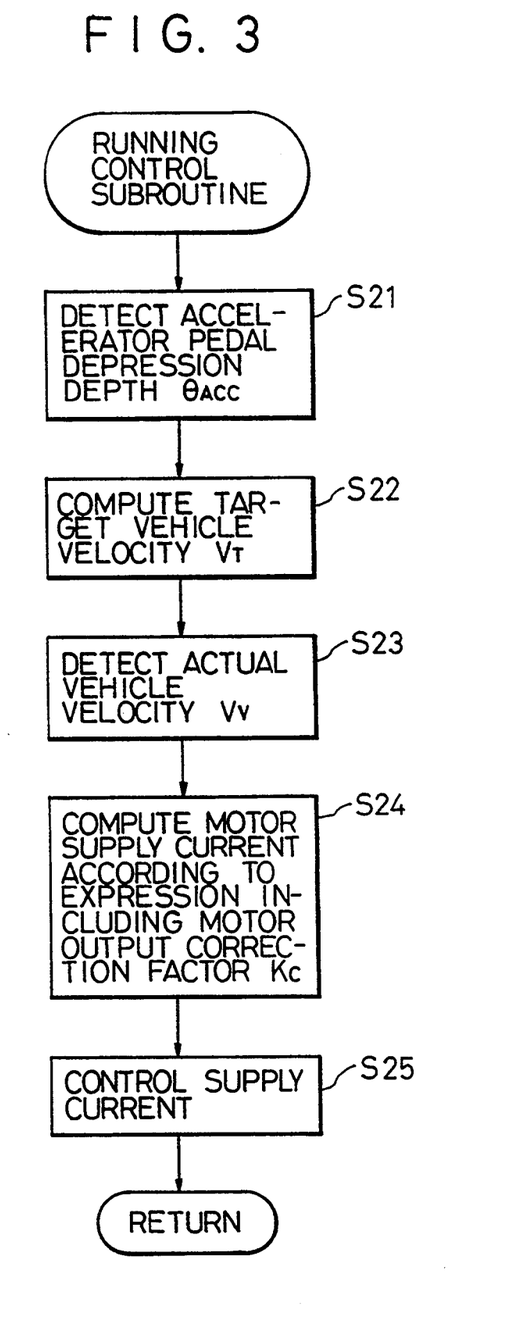
FIG. 3 is a flow chart illustrating the detail of a running control subroutine shown in FIG. 2.

In the running control subroutine shown in FIG. 3, the processor first detects an accelerator pedal depression depth $\theta_{ACC}$ by reading the output of an accelerator pedal depression depth sensor (Step S21), and then obtains a target vehicle velocity $V_T$, compatible with the depression depth $\theta_{ACC}$ detected in Step S21, in accordance with operational expressions or lookup tables for setting the target vehicle velocity (Step S22). The expressions or tables, which correspond to a characteristic curve (FIG. 5) indicative of the relationships between the accelerator pedal depression depth $\theta_{ACC}$ and the target vehicle velocity $V_T$, are previously described in the control programs or stored in the memories of the controller 60.

Figure 5:
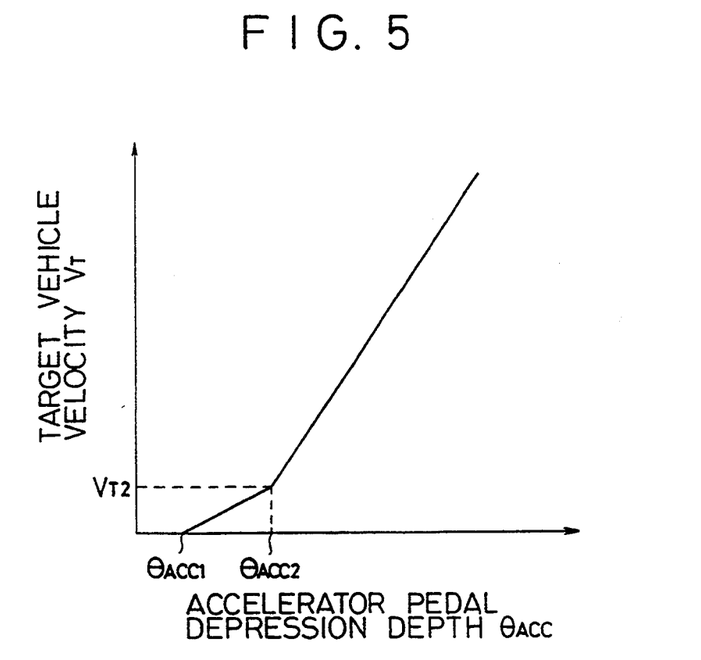
FIG. 5 shows a characteristic curve illustrating the relationships between the accelerator pedal depression depth ($\theta_{ACC}$) and target vehicle velocity ($V_T$) used in the running control subroutine.

As shown in FIG. 5, the target vehicle velocity $V_T$ is set so that it becomes zero to prevent the vehicle from starting to run in a first depression depth region where the accelerator pedal depression depth $\theta_{ACC}$ takes a small value ranging from zero to $\theta_{ACC1}$, and increases from zero to $V_{T2}$ to allow the vehicle slowly to start running as the depression depth $\theta_{ACC}$ increases in a second depression depth region where the depression depth $\theta_{ACC}$ takes a relatively small value ranging from $\theta_{ACC1}$ to $\theta_{ACC2}$. In a third depression depth region where the depression depth $\theta_{ACC}$ exceeds $\theta_{ACC2}$, moreover, the target vehicle velocity $V_T$ increases from $V_{T2}$, at a rate higher than the increasing rate for the second region, to allow normal vehicle running as the depression depth $\theta_{ACC}$ increases.

Referring again to FIG. 3, the processor of the controller 60 reads the output of a vehicle velocity sensor to detect an actual vehicle velocity $V_V$ (Step S23) after setting the target vehicle velocity $V_T$, and then computes a motor current supply (required motor driving current amount) I (Step S24). In computing the motor current supply I, the processor first calculates a vehicle velocity difference ($=V_V-V_T$) on the basis of the actual vehicle velocity $V_V$ detected in Step S23 and the target vehicle velocity $V_T$ set in Step S22, and then sets a required vehicle body acceleration $\alpha$, which is compatible with the previously detected actual vehicle velocity $V_V$ and the previously calculated vehicle velocity difference ($=V_V-V_T$), in accordance with operational expressions or lookup tables for setting the required vehicle body acceleration, which correspond to characteristic curves (FIG. 6) indicative of the relationships between the actual vehicle velocity, the vehicle velocity difference, and the required vehicle body acceleration.

Figure 6:
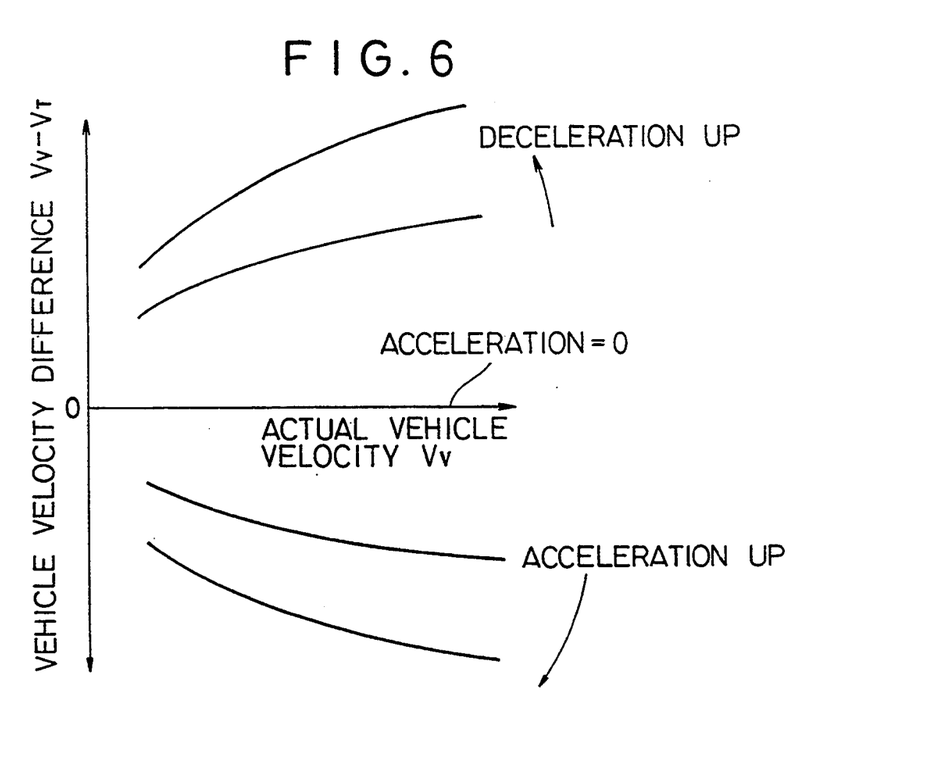
FIG. 6 shows characteristic curves illustrating the relationships between the actual vehicle velocity ($V_V$), vehicle velocity difference ($V_V - V_T$), and vehicle body acceleration ($a$) used in the running control subroutine.

As shown in FIG. 6, the required vehicle body acceleration $\alpha$ takes a negative value, which is indicative of the necessity of decelerating operation of the vehicle, if the actual vehicle velocity $V_V$ is higher than the target vehicle velocity $V_T$, and therefore, the vehicle velocity difference is positive. If the vehicle velocity difference is negative, on the other hand, the acceleration $\alpha$ takes a positive value which is indicative of the necessity of the accelerating operation. The absolute value of the acceleration $\alpha$ increases in proportion to the actual vehicle velocity even though the absolute value of the vehicle velocity difference is fixed.

After setting the required vehicle body acceleration $\alpha$ in this manner, the processor computes a required motor output $P_s$ in accordance with an operational expression, $P_s = [\{C \cdot A \cdot (V_{AVE})^2 + \mu \cdot W + \alpha \cdot W/g\} \cdot V_{AVE}]/(K1 \cdot \eta)$ with $V_{AVE} = (V_V + V_T)/2$, where C, A, $V_{AVE}$, $V_V$ $\mu$, W, $\alpha$ and $\eta$ are the air resistance front projected area, average vehicle velocity, actual velocity, rolling coefficient of resistance, overall weight, required body acceleration, and power transmissibility, respectively, of the vehicle. Further, g and K1 are the acceleration of gravity and unit conversion factor, respectively, and the factor K1 is adjusted to, e.g., 270. The above operational expression is adapted for the calculation of motor output where the road has no gradient. Instead of making the computation according to this expression, in setting the required motor output, a lookup table for setting the motor output may be used for reference.

Then, the processor computes the required driving current value (motor current supply) I in accordance with an operational expression, $I=(K_C \cdot K2 \cdot P_S)/(\eta_{MTR} \cdot V)$, where $K_C$ is a motor output correction factor, which is set to "1" when the engine operation, described in detail later, for causing power electric generation by the generator 30 is not effected, and is set to a value smaller than "1" when the engine is operated for the power generation. K2, $P_S$, $\eta_{MTR}$ and V are a unit conversion factor, required motor output, motor efficiency of the electric motor 10, and motor operating voltage of the electric motor 10, respectively, and the factor K2 is adjusted to, e.g., 735.

The above operational expression for setting the required motor driving current value I, with which the required motor output Ps determined by the accelerator pedal depression depth $\theta_{ACC}$ and the vehicle velocity difference can be produced, shows, in a broad sense, a characteristic representing the motor output required by operation of the accelerator pedal. This characteristic changes with engine operating conditions, as can be soon From the fact that the operational expression includes the motor output correction factor $K_C$ which varies depending on whether the engine is in operation or at rest. Namely, when the engine is stopped and the battery output voltage is applied to the electric motor 10, the required motor current value I is computed by using the value "1" as the motor output correction factor $K_C$. On the other hand, when the engine is operating and the electric generator 30 applies a voltage higher than the battery output voltage to the electric motor 10, the motor current value I is computed by using a value smaller than "1" as the correction factor $K_C$. Consequently, changes of the voltage applied to the electric motor 10 caused due to different engine states, i.e., operated or non-operated state (in a broad sense, changes in the engine operating conditions) can be compensated for, thus making it possible to properly calculate the required motor current value I.

In Step S25, the processor delivers a control signal (more generally, command motor output) indicative of the required motor driving current value I to the current control device 50. In response to this control signal, the current control device 50 performs, for example, duty control such that a motor driving current of the value I is supplied from the battery 20 to the electric motor 10 through the current control device 50. As a result, electric power is supplied from the battery to the motor such that a motor output, suited to the operating conditions of the vehicle and engine, is produced, whereby the actual vehicle velocity $V_V$ increases or decreases to or is kept at the value of the target vehicle velocity $V_T$. If the accelerator pedal depression depth is greater than the value $\theta_{ACC1}$ immediately after the starter key is turned on, therefore, the electric motor 10 is actuated to allow the vehicle to start running.

Referring again to FIG. 2, the processor of the controller 60 reads the battery capacity signal from the battery capacity sensor 21 after the running control subroutine (Step S2) is finished, and determines, in accordance with the read signal, whether or not the storage amount of the battery 20 is smaller than a predetermined necessary amount for the electric motor 10 to cause the vehicle to run satisfactorily (Step S3). If the result of decision in this step is NO, that is, if the battery storage amount is not smaller than the predetermined storage amount so that the battery 20 need not be charged, the processor determines whether the starter key is off (Step S4). If the result of decision in this step is YES, the processor delivers an internal combustion engine control signal for an instruction to stop the internal combustion engine 40 to the engine drive system (Step S5). As a result, the internal combustion engine 40 is kept in a stopped state when its operation is suspended, and the engine operation is stopped when the engine is operating. Thus, exhaust gas can be prevented from being produced by useless engine operations. Subsequently, the processor executes key-off processes, including writing control data in a backup memory, checking the operating conditions of the various components of the hybrid car, etc. (Step S6), whereupon the main routine is finished.

The battery storage amount may become smaller than the predetermined amount while the aforementioned series of processes of Steps S2 to S4 are repeated without turning off the scatter key so that the required driving current is supplied to the electric motor 10 as the vehicle runs. In this case, the battery 20 must be charged. If it is concluded in Step S3 that the battery charging is necessary, the processor reads the catalyst temperature signal from the catalyst temperature sensor 43, and determines, in accordance with the read signal, whether or not the catalyst temperature is lower than a predetermined necessary temperature for satisfactory activation of the catalyst (Step S7). If the result of the decision in this step is YES, and therefore, exhaust gas containing pollutant or noxious gases may possibly be discharged from the internal combustion engine 40 when the engine is operated, the processor delivers the engine control signal for the instruction to stop the engine to the engine drive system (Step S8), thereby maintaining the stopped state of the internal combustion engine 40 or stopping the engine operation when the engine is operating. Thus, if the catalyst temperature lowers from any cause during the engine operation, the engine operation is stopped.

In Step S9, the processor delivers a control signal for an instruction for current supply to the catalyst heater of the exhaust gas purifier 42 to the current control device 50. In response to this control signal, the current control device 50 operates so that a heating current is supplied from the battery 20 to the heater. Accordingly, the heater is energized to heat the catalyst. After the instruction for the current supply to the heater is given, the processor determines again whether the starter key is turned off or not (Step S4). If the key is not turned off, the processor returns to Step S2, and then repeatedly executes the aforesaid series of processes of Steps S2, S3, S7, S8, S9 and S4.

If it is concluded in Step S7, thereafter, that the catalyst temperature has reached a predetermined temperature, and therefore, the exhaust gas purifier 42 is in an operating state such that the pollutant or noxious gases can be removed from the exhaust gas by the exhaust gas purifying effect of the catalyst, the processor delivers a control signal for an instruction to stop the current supply to the catalyst heater to the current control device 50 (Step S10). As a result, the current supply to the heater is stopped. Then, the processor executes an engine control subroutine shown in detail in FIG. 4 (Step S11).

Figure 4:
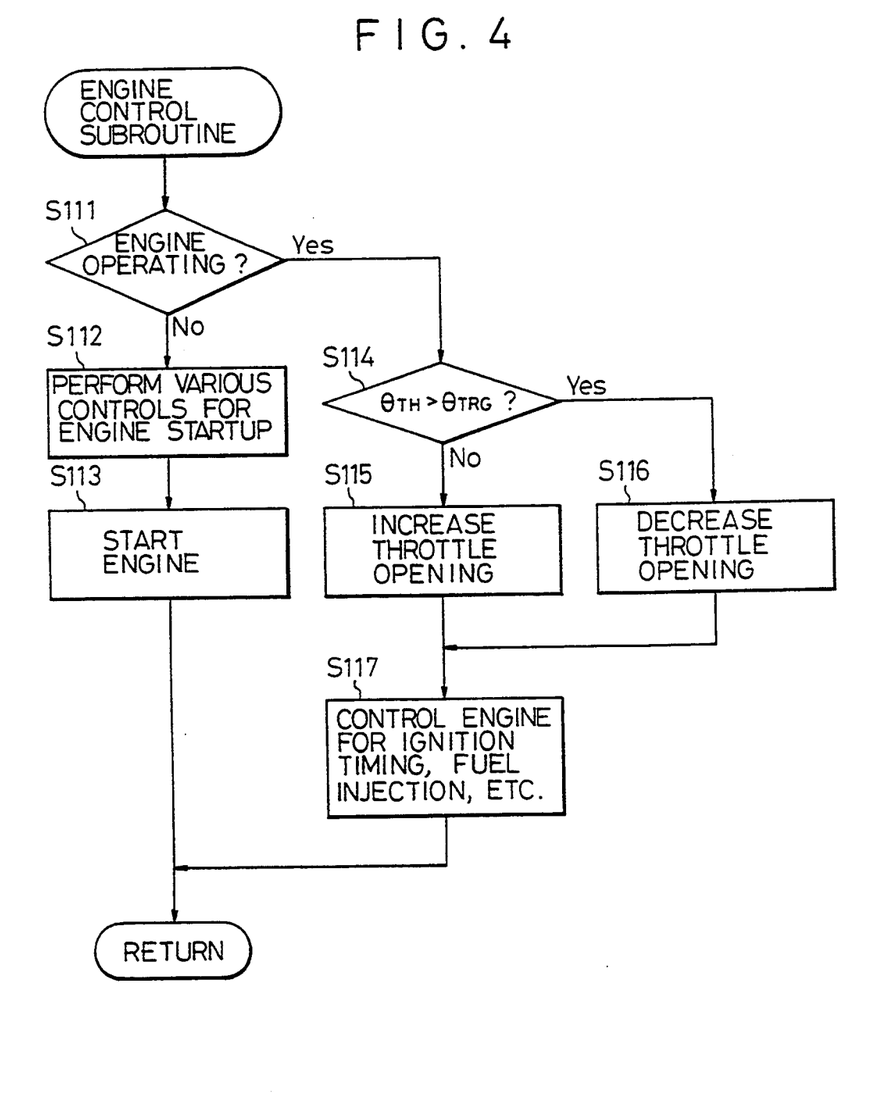
FIG. 4 is a flow chart illustrating the detail of an engine control subroutine shown in FIG. 2.

In the engine control subroutine shown in FIG. 4, the processor determines whether the internal combustion engine 40 is operating or not, with reference to the contents of the memories of the controller 60 which indicate whether an engine control signal for an instruction to operate the engine is delivered or not (Step S111). If the result of decision in this step is NO, the processor executes various control operations for engine startup (Step S112). For example, the processor delivers a current control device control signal for an instruction to start a fuel pump (not shown) to the current control device 50. Also, the processor delivers an engine control signal for an instruction to actuate the throttle valve by a required angle in a required direction as determined by a current throttle valve opening obtained based on the output of the throttle valve opening sensor and a predetermined throttle valve opening for engine startup, to a throttle valve actuating mechanism of the engine drive system including a pulse motor, for example. As a result, the current control device 50 operates such that a required driving current is supplied from the battery 20 to a fuel pump drive motor (not shown) through the current control device 50, thereby starting the fuel pump, and the throttle valve is positioned at a predetermined angular position for engine startup.

Then, the processor delivers a current control device control signal for an instruction to start the engine to the current control device 50 (Step S113). As a result, the current control device 50 operates so that a required driving current is supplied from the battery 20 to the starter (electric generator 30) through the current control device 50. Accordingly, the internal combustion engine 40 is started by means of the electric generator 30 which serves as the starter. Thus, the electric generator 30 is driven by the internal combustion engine 40 to start the power generation.

After the present cycle of the engine control subroutine is finished in this manner, it is again determined in Step S4 of the main routine (FIG. 2) whether the starter key is turned off or not. If the result of decision in this step is YES, an instruction to stop the engine is given in Step S5, and the key-off processes are executed in Step S6, whereupon the execution of the main routine is finished. If it is concluded in Step S4 that the starter key is not off, the process of Step S2 (running control subroutine) and the subsequent processes are executed again in the aforesaid manner. Since the internal combustion engine 40 is already started in the previous engine control subroutine, it is concluded in Step S111 of the engine control subroutine (Step S11), executed again following the series of processes of Steps S2, S3, S7 and S10, that the engine is operating.

In this case, the processor of the controller 60 reads out a preset target throttle opening $\theta_{TRG}$, detects the actual throttle opening $\theta_{TH}$, based on the output of the throttle valve opening sensor, and then determines whether the current throttle valve opening $\theta_{TH}$ is greater than the target throttle valve opening $\theta_{THG}$ (Step S114). If the result of decision in this step is NO, the processor delivers an engine control signal for an instruction to actuate the throttle valve in a direction to open the same, to the engine drive system (Step S115). If it is concluded in Step S114 that the throttle valve opening $\theta_{TH}$ is greater than the target throttle valve opening $\theta_{TH}$, the processor delivers an engine control signal for an instruction to actuate the throttle valve in a direction to close the same, to the engine drive system (Step S116). As a result, the throttle valve of the internal combustion engine 40 is opened or closed by the throttle valve actuating mechanism, in accordance with the result of decision in Step S114, and the throttle valve opening is controlled to the target opening $\theta_{TRG}$. Then, in Step S117, which is executed following Step S115 wherein the throttle valve is actuated toward the open position, or Step S116 wherein the throttle valve is actuated toward the closed position, normal engine controls including ignition timing control, fuel injection control, etc. are carried out.

On returning to the main routine after the engine control subroutine is finished, an instruction to stop the engine is given and the key-off processes are carried out (Steps S5 and S6) or the running control subroutine is executed (Step S2), in accordance with the result of the decision in Step S4 of the main routine, as previously explained.

The following is a summary of the above-described operation control of the various components of the hybrid car by means of the controller 60. When the starter key is turned on, computation of the current supply I to the electric motor 10 and control of the motor current supply are started, and this motor control is carried out periodically, thereafter. As a result, the hybrid car, which uses the electric motor 10 as its drive source, runs. If the storage amount of the battery 20 is sufficient while the vehicle is running, the operation of the internal combustion engine 40 for driving the electric generator 30 is stopped, so that useless discharge of exhaust gas can be prevented. If there is a possibility of the battery storage amount becoming insufficient, the internal combustion engine 40 is started to cause the electric generator 30 to generate electric power, so that the battery 20 is charged with the generated power. If the catalyst temperature measured before starting the engine operation is lower than the necessary temperature for the activation of the catalyst, the catalyst heater is energized to heat the catalyst. Since such battery charging is carried out every time the vehicle runs, the power supply from the battery 20 alone can normally enable the vehicle to run before heating the catalyst is completed after the start of the vehicle running. When the catalyst heating is finished, the battery can be charged as required. Normally, therefore, the hybrid car never finds it difficult to run in the course of its running. When the starter key is turned off, the aforementioned motor control is finished to stop the vehicle running effected by the electric motor 10, and the operation of the engine is stopped.

When the motor driving current I, with which the required motor output $P_S$ matching the vehicle operating conditions can be produced, is calculated in the motor current supply control, the value of the motor output correction factor $K_C$ in the operational expression is changed depending on whether the engine is operating or stopped. This permits a compensation of the difference between the voltage applied from the electric generator 30 to the electric motor 10 during engine operation and the voltage applied from the battery 20 to the electric motor 10 during engine stoppage. Consequently, the required motor driving current I, always matched with the operating conditions of the vehicle and engine, is supplied to the motor, thus making it possible to produce a suitable motor output, and hence the vehicle running characteristics do not change depending on whether the engine is operating or stopped.

More specifically, the command motor output is determined in accordance with the characteristic representing the motor output required by operation of the accelerator pedal, and based on the command motor output, the power supply from the generator or battery to the electric motor is controlled. When the engine operating condition changes, the characteristic for determining the command motor output is changed in accordance with a change of the engine operating condition, for example, an associated change in the output voltage of the generator. As a result, the command motor output is variably controlled in such a manner as to compensate for an error, for example, a change of the voltage applied to the motor, which error is caused due to a change of the engine operating condition and brings about a change of the motor output. Accordingly, even in the case where the engine operating condition undergoes a variety of changes while the vehicle is running, a motor output matched with the vehicle operating conditions, which vary as the accelerator pedal is operated, can always be produced with accuracy, thus improving the power performances of the vehicle. Further, the battery charging is carried out to enhance the power performances and cruising range of the vehicle, and when the battery charging is not necessary, the operation of the engine is stopped to improve the exhaust gas characteristics.

In the foregoing embodiment, the engine is operated or stopped according to the necessity for the battery charging, and the motor output correction factor $K_C$ in the expression for calculating the required motor driving current I is changed in the range between "1" and a value smaller than "1" depending on whether the engine is operating or stopped. Alternatively, the engine may be operated in various operating conditions, and the correction factor $K_C$ may be changed continuously or in a multistage fashion in accordance with the engine operating conditions (operated/non-operated state and various operating states of the engine). Further, the correction factor $K_C$ may be changed in accordance with the output voltage of the electric generator 30 which varies with engine operating conditions. Although in the above embodiment, power supply to the motor is controlled in accordance with the command motor driving current I corresponding to the command motor output, some other control parameter representing the command motor output may be used in place of the command motor driving current I. Furthermore, in the present embodiment, the motor driving current I is obtained based on the accelerator pedal depression depth $\theta_{ACC}$. Instead, the command motor output may be determined based on some other parameter representing an actuation of the accelerator pedal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An operating method for a hybrid car which has an electric motor for driving the hybrid car, a battery for supplying electric power to the electric motor, a generator for charging the battery, and an internal combustion engine operatively isolated from the electric motor and used to drive the generator, the method comprising the steps of:
   (a) discriminating an operating state of the hybrid car by first discriminating means;
   (b) discriminating a charged state of the battery by second discriminating means;
   (c) controlling the operating state of the internal combustion engine by a controller in accordance with at least one results of the discriminations relating to the hybrid car operating state and the battery charged state by said first and second discriminating means at said steps (a) and (b); and
   (d) controlling the electric power supplied to the electric motor, said step (d) including the steps of:
      (d) (2) supplying electric power solely from the battery to the electric motor in accordance with the operating state of the hybrid car when the internal combustion engine is in a non-operating condition, and
      (d) (2) supplying electric power generated by the generator to the electric motor when the internal combustion engine is operated to generate electric power by the generator, the electric power from the generator being adjusted such that an equivalent generator electric power to the battery electric power, obtained through an equivalence conversion, or a sum of the equivalent generator electric power and the battery electric power matches the operating state of the hybrid car.

2. An operating method for a hybrid car according to claim 1, wherein said equivalence conversion at said step (d) (2) is carried out by using a factor having a specific fixed value.

3. An operating method for a hybrid car according to claim 1, wherein said equivalence conversion at said step (d) (2) is carried out by using a factor whose value changes in a multistage fashion in accordance with the quantity of electric power generated by the generator.

4. An operating method for a hybrid car according to claim 1, wherein said equivalence conversion at said step (d) (2) is carried out by using a factor whose value changes continuously in accordance with the quantity of electric power generated by the generator.

5. A control system for controlling power generation in a hybrid car comprising:
   an electric motor for driving the hybrid car;
   a battery for supplying electric power to said electric motor;
   a generator for charging said battery;
   an internal combustion engine operatively isolated from said electric motor for driving said generator;
   first discriminating means for discriminating an operating state of the hybrid car;
   second discriminating means for discriminating a charged state of said battery; and
   a controller for controlling the operating state of said internal combustion engine in accordance with at least one result of the discriminations relating to the hybrid car operating state and the battery charged state by said first and second discriminating means and controlling the electric power supplied to said electric motor by supplying electric power solely from said battery to said electric motor in accordance with the operating state of the hybrid car when said internal combustion engine is in a non-operating condition and by supplying electric power generated by said generator to said electric motor when said internal combustion engine is operated to generate electric power by said generator, the electric power from the generator being adjusted such that an equivalent electric power to the battery electric power, obtained through an equivalence conversion, or a sum of the equivalent generator electric power and the battery electric power matches the operating state of the hybrid car.

6. A control system according to claim 5, wherein said controller carries out said equivalence conversion by using a factor having a specific fixed value.

7. A control system according to claim 5, wherein said controller carries out said equivalence conversion by using a factor whose value changes in a multistage fashion in accordance with the quantity of electric power generated by said generator.

8. A control system according to claim 5, wherein said controller carries out said equivalence conversion by using a factor whose value changes continuously in accordance with the quantity of electric power generated by said generator.

* * * * *